United States Patent
Weiss et al.

(10) Patent No.: US 6,814,052 B2
(45) Date of Patent: Nov. 9, 2004

(54) METHOD FOR CONTROLLING THE VALVE LIFT OF DISCRETELY ADJUSTABLE INLET VALVES IN A MULTI-CYLINDER INTERNAL COMBUSTION ENGINE

(75) Inventors: Frank Weiss, Pentling/Grasslfing (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/615,339

(22) Filed: Jul. 9, 2003

(65) Prior Publication Data

US 2004/0074475 A1 Apr. 22, 2004

(30) Foreign Application Priority Data

Jul. 10, 2002 (DE) .......................................... 102 31 143

(51) Int. Cl.[7] .............................................. F00D 41/00
(52) U.S. Cl. ...................... 123/350; 123/90.1; 123/352; 123/406.12
(58) Field of Search .................. 123/90.1, 90.15–90.19, 123/350, 352, 399, 406.12, 679, 344–348

(56) References Cited

U.S. PATENT DOCUMENTS

| | | | | |
|---|---|---|---|---|
| 5,103,792 A | * | 4/1992 | Winkler et al. ............. | 123/506 |
| 5,209,201 A | * | 5/1993 | Horie et al. ................. | 123/308 |
| 5,263,441 A | * | 11/1993 | Rembold et al. ......... | 123/90.12 |
| 5,460,130 A | * | 10/1995 | Fukuzawa et al. ........ | 123/90.16 |
| 5,632,261 A | * | 5/1997 | Maki et al. ................. | 123/674 |
| 5,996,540 A | * | 12/1999 | Hara ........................ | 123/90.16 |
| 6,041,279 A | * | 3/2000 | Maki et al. ................. | 701/104 |
| 6,041,746 A | * | 3/2000 | Takemura et al. ....... | 123/90.16 |

FOREIGN PATENT DOCUMENTS

| | | |
|---|---|---|
| DE | 3934848 A1 | 4/1991 |
| DE | 4226798 A1 | 2/1994 |
| DE | 68911664 T2 | 4/1994 |
| DE | 19532164 A1 | 3/1997 |

* cited by examiner

*Primary Examiner*—John T. Kwon
(74) *Attorney, Agent, or Firm*—Morrison & Foerster LLP

(57) ABSTRACT

To avoid a sudden change in torque when switching over the valve lift of discretely adjustable inlet valves, the valve lift is firstly only adjusted for a section of cylinders, while the valve lift for the remaining section of cylinders is switched over after a delay. Therefore with each valve lift adjustment, only a slight change in torque has to be compensated by means of a corresponding change in the efficiency of the cylinders.

16 Claims, 2 Drawing Sheets

METHOD FOR CONTROLLING THE VALVE LIFT OF DISCRETELY ADJUSTABLE INLET VALVES IN A MULTI-CYLINDER INTERNAL COMBUSTION ENGINE

CLAIM FOR PRIORITY

This application claims priority to German Application No. 10231143.9, which was filed in the German language on Jul. 10, 2002.

TECHNICAL FIELD OF THE INVENTION

The present invention relates to a method for controlling the valve lift of discretely adjustable inlet valves in a multi-cylinder internal combustion engine, the operation of which is regulated by an electrical operation control unit.

BACKGROUND OF THE INVENTION

Internal combustion engines with inlet valves, the valve lift of which can be adjusted between a low and high value, in other words discretely, for example using an adjustment mechanism, are increasingly being used in motor vehicles, for example see DE 195 20 117 and MTZ Motortechnische Zeitschrift 61 (2000), 11, p. 730–743. On switching over the valve lift, the air mass in the cylinders as well as the volume of injected fuel undergo a sudden change, which causes a correspondingly sudden change in the torque, unless the torque is suppressed via a regulating operation. An option for suppressing these sudden changes in torque is by operating the cylinders at a reduced level of efficiency, for instance by adjusting the ignition angle, directly after a valve lift switchover, for example from a lower to a higher value, thus decreasing the excess torque that is created when the valve lift switches over. However, such a switchover strategy would be at the expense of increased fuel consumption.

SUMMARY OF THE INVENTION

In one embodiment of the present invention, there is a method for controlling the valve lift of discretely adjustable inlet valves in a multi-cylinder internal combustion engine, permitting a valve lift switchover which consumes as little fuel as possible at a torque which is as regular as possible.

In one aspect according to the invention, the valve lift is firstly adjusted for a section of cylinders, while the remaining section of cylinders is adjusted after a delay.

In doing so, it is possible for the valve lift to be adjusted for each individual cylinder or in groups of cylinders in succession. However, it is preferable for the valve lift to be adjusted firstly for half the cylinders and then for the other half. In each case, it is important to note that the valve lift for the first section of cylinders is adjusted in such a way that combustion in each cylinder in the first section of cylinders takes place alternately with combustion in a cylinder in the second section of cylinders.

By switching the valve lift over in stages as proposed according to the invention, only a small change in torque occurs each time during the switchover processes, which can be compensated with greater ease and more efficient consumption via a corresponding regulating control operation. The respective change in torque which would arise if no regulating control operation took place during the switchover processes is expediently compensated by changing the efficiency of at least some of the cylinders. The change in efficiency is preferably achieved by changing the ignition angle for the cylinders in question. Another option for compensating the change in torque is to change the air/fuel ratio. It is also possible to combine both options.

When the valve lift is adjusted for the first section of cylinders, the throttle valve mounted in the intake tract of the internal combustion engine is expediently adjusted in such that the pressure in the intake tract moves toward a target value, at which all cylinders operate again at optimum efficiency once the valve lift has been switched over.

Once the valve lift has been adjusted for the first section of cylinders, the regulating control by the electronic operation control unit ensures that the cylinders return to operating at optimum efficiency, e.g. with a base ignition angle and/or an air/fuel ratio of one. The valve lift for the second section of cylinders is to be adjusted at this point at the latest.

If the change in torque occurring with a valve lift adjustment without any additional regulating control operation is compensated by adjusting the ignition angle, the case may arise under specific operating conditions in which the ignition angle adjustment required to avoid a sudden change in torque is so large that the minimum ignition angle would have to be undershot. However, as the regulating control by the operation control unit restricts the ignition angle to the minimum ignition angle, a sudden change in torque would nevertheless occur in this case.

According to another aspect of the present invention, a criterion is specified for the option of switching valve lift over at neutral torque. If this criterion shows that it is not possible to switch valve lift over at neutral torque with a required valve lift switchover, there will either be no valve lift switchover at this point or a valve lift adjustment will take place for a reduced number of cylinders.

BRIEF DESCRIPTION OF THE DRAWINGS

Further details according to the invention are described in connection with the drawings, in which.

DETAILED DESCRIPTION OF THE INVENTION

Figure 1:
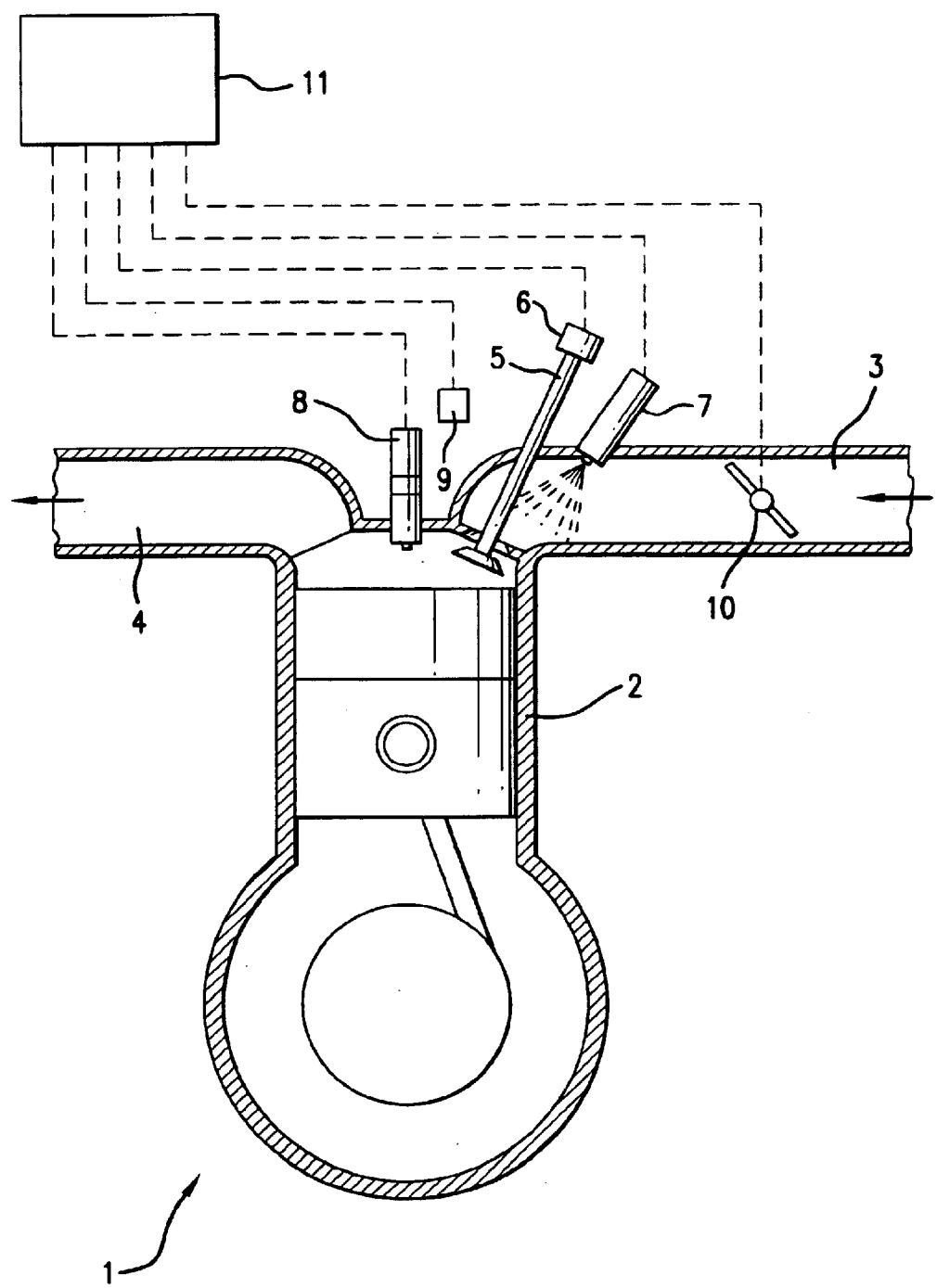
FIG. 1 shows an internal combustion engine.

FIG. 1 shows a gas-type internal combustion engine 1 having several cylinders 2 (only one of which is indicated), an intake tract 3, an exhaust tract 4, an inlet valve 5, an outlet valve (not shown), an actuator with an adjustment mechanism 6 for discretely adjusting the valve lift of the inlet valve 5, an injection valve 7 for the injection of fuel, a spark plug 8 having an ignition angle adjustment mechanism 9 and a throttle valve 10 in the form of a butterfly valve, which is mounted in the intake tract 3. Further devices required for operating the internal combustion engine 1 which are known to the person skilled in the art are not shown, as they are not necessary to the understanding of the present invention.

The operation of the internal combustion engine 1 is regulated by an electronic operation control unit 11. As indicated by the dashed lines, the operation control unit 11 is connected to the inlet valve 5 and/or adjustment mechanism 6 thereof, to the injection valve 7, to the spark plug 8, to the ignition angle adjustment mechanism 9 and to the throttle valve 10 by means of control leads, in order to regulate operation depending on sensor signals. As such a method of regulation is essentially known to the person skilled in the art, it will only be described here to the extent necessary for the understanding of the method according to the invention for controlling the valve lift of inlet valves.

The valve lift of inlet valves 5 in the exemplary embodiment can be adjusted by means of the adjustment mechanism 6 between a low and high valve lift, with high valve lift leading to the relevant cylinders being filled for example 50% more in comparison with low valve lift.

It is now assumed that the valve lift of inlet valves 5 is to be switched from the low to high value. At this point, the required torque TQ_REQ_CLU delivered by the internal combustion engine 1 to its clutch (not shown) is for example 100 Nm. Furthermore, if $TQ_{k1}$=100 Nm for the actual clutch torque with a low valve lift, the actual clutch torque with a high valve lift would be $TQ_{gr}$=150 Nm.

The operation control unit 11 now adjusts the valve lift of the inlet valves 5 for half the cylinders, i.e. for two cylinders in the case of a four-cylinder internal combustion engine. If this valve lift adjustment is carried out without an additional regulating control operation, a torque of (100 Nm+150 Nm)/2=125 Nm is delivered. To avoid this sudden change in torque, in other words to ensure constant torque, the cylinders with high valve lift at least, and if necessary the cylinders with low valve lift as well, are operated at reduced efficiency. This is achieved by adjusting the ignition angle from a base ignition angle toward a later ignition point (thus referred to as ignition angle resetting). Alternatively, as mentioned above, the reduction in efficiency can also be achieved by operating the cylinders with a leaner air/fuel ratio.

At the same time, the throttle valve 10 is adjusted in the close direction, in order to reduce the pressure in the intake tract 3 downstream of the throttle valve 10.

The throttle valve 10 of the operation control unit 11 is expediently set at a degree of opening at which a pressure is achieved in the intake tract 3 producing a torque of 100 Nm, provided the valve lift for all cylinders has been set to a high value.

Due to the drop in pressure in the intake tract 3, the torque $TQ_{k1}$ delivered by the cylinders with low valve lift also drops. The difference between the required torque TQ_REQ_CLU and torque $TQ_{k1}$ must be taken over by the cylinders with high valve lift. Each of these cylinders must therefore deliver the following additional torque: (TQ_REQ_CLU−$TQ_{k1}$)/number of cylinders. For each of these cylinders with a high valve lift, a required torque of (TQ_REQ_CLU+TQ_REQ_CLU−$TQ_{k1}$)/number of cylinders is therefore produced.

While the ignition angle adjustment immediately impacts on the combustion in the cylinders after the valve lift adjustment, the change in pressure in the intake tract 3 caused by the adjustment to the throttle valve 10 is only noticeable in the cylinders after a delay. Due to a regulating control by the operation control unit 11, the ignition angles for the relevant cylinders during this time are readjusted toward the base ignition angle. In the present example, the base ignition angle for the relevant cylinders is reached when $TQ_{k1}$=80 Nm and $TQ_{gr}$=120 Nm.

At this point at the latest, the valve lift for the other half of the cylinders is adjusted to the high value. After this switchover, the cylinders are again operated at reduced efficiency by adjusting the ignition angle (and/or by adjusting the air/fuel ratio). As soon as the pressure in the intake tract 3 has reached the target value, the base ignition angle for the cylinders is again set via a regulating control by the operation control unit 11, so that all cylinders then run again at optimum efficiency.

If the valve lift of the inlet valves 5 is switched from a high to low value, the same measures will be taken correspondingly, but in a reverse sequence. First of all, before any valve lift adjustment, the throttle valve 10 is adjusted in the open direction, and at the same time the ignition angle for the cylinders is adjusted toward a later ignition point, in order to operate the cylinders at reduced efficiency. If the pressure in intake tract 3 then reaches a satisfactory value, the valve lift is adjusted to a low value for half the cylinders. The value of the pressure in the intake tract 3, at which the valve lift is adjusted, is selected such that the efficiency of all cylinders after adjusting the valve lift of the first half of the cylinders is close to one. The efficiency of cylinders with high valve lift and if applicable of cylinders with low valve lift then decreases relative to the increasing pressure in the intake tract 3. As soon as this pressure is sufficient to be able to provide the required torque with low valve lift for all cylinders, the valve lift for the second half of the cylinders is switched over to a low value. After this, all cylinders will again run at an efficiency of one.

As already mentioned, the reduction in efficiency of the cylinders can also be effected by creating a leaner air/fuel mix or by combining both methods. It should also be noted when adjusting the valve lift, that consecutive combustion cylinders have different valve lifts. In other words, combustion takes place alternately between a cylinder with low valve lift and then a cylinder with high valve lift. This makes it easy to switch over with relatively simple calculation of the corresponding operating parameters.

The described valve lift switchover method can also be used for internal combustion engines which have inlet valves enabling multi-stage discrete valve lift adjustment instead of two-stage adjustment. The described method is also correspondingly suitable for switching over inlet valves for each cylinder individually, with the cylinders being switched over according to their valve lift, e.g. one after the other or consecutively in pairs.

With the method described above to switch over valve lift, it was tacitly assumed that it would be possible to adjust the ignition angle in order to reduce the efficiency of the cylinders, and that this angle would be sufficiently large to avoid a sudden change in torque with the respective valve lift switchover. However, there are also possible operating conditions in which, for a valve lift switchover at neutral torque, an ignition angle adjustment is required which is so large that the minimum ignition angle has to be undershot. In this case, the operation control unit 11 would restrict the ignition angle to the minimum ignition angle, which would in turn cause a sudden change in torque.

It is therefore desirable to identify a criterion for determining whether or not it is possible to switch over valve lift at neutral torque under a specific operating condition (i.e. to switch over valve lift without any sudden change in torque).

Such a criterion is described below, initially for the case in which the inlet valves of a low valve lift (cam lift) are switched over to a high valve lift (cam lift).

The following equation is applicable for the limit of a valve lift switchover process at neutral torque:

$$NR\_ZYL * TQI_{k1\_N} * EFF\_IGA\_BAS_{k1\_N} = NR\_ZYL/2 * (TQI_{k1\_N} * EFF\_IGA\_MIN_{k1\_N} + TQI_{gr\_N} * EFF\_IGA_{gr\_N}) \quad (1)$$

Where:
NR_ZYL: Number of cylinders
$TQI_{k1\_N}$: Indicated torque of cylinder with low cam lift
$TQI_{gr\_N}$: Indicated torque of cylinder with high cam lift
$EFF\_IGA_{gr\_N}$: Efficiency of cylinder with high cam lift dependent on ignition angle
$EFF\_IGA\_BAS_{k1\_N}$: Efficiency of cylinder with base ignition angle and low cam lift $EFF\_IGA\_MIN_{k1\_N}$: Efficiency of cylinder with minimum ignition angle and low cam lift The left-hand side of the equation (1) represents the torque of all cylinders before a valve lift switchover process, with the cylinders being operated at the base ignition angle (i.e. the optimum ignition angle). After adjusting the valve lift of half the cylinders, the same torque is to be produced, which is shown on the right-hand side of the equation (1). The assumed limit state in this equation was that the ignition angle for the non-switched cylinder with low cam lift was adjusted to the minimum ignition angle. The term $TQI_{gr\_N} * EFF\_IGA_{gr\_N}$ indicates the torque which is delivered after the valve lift switchover of cylinders with high cam lift in order to fulfill the equation (1), i.e. in order to enable a switchover process at neutral torque. Equation (1) gives the following for efficiency $EFF\_IGA_{gr\_N}$:

$$EFF\_IGA_{gr\_N} = (2*TQI_{k1\_N}*EFF\_IGA\_BAS_{k1\_N} - TQI_{k1\_N}*EFF\_IGA\_MIN_{k1\_N})/TQI_{gr\_N} \quad (2)$$

This is the efficiency of a cylinder with high cam lift dependent on the ignition angle, at which the cylinders with high cam lift have to operate after the switchover process, in order to avoid a sudden change in torque. If this required efficiency $EFF\_IGA_{gr\_N}$ is lower than the efficiency $EFF\_IGA\_MIN_{gr\_N}$ for the minimum ignition angle at high cam lift, the ignition angle would be limited to the minimum ignition angle, which would then lead to a sudden positive change in torque.

When operating the internal combustion engine with low valve lift, efficiency $EFF\_IGA_{gr\_N}$ and efficiency $EFF\_IGA\_MIN_{gr\_N}$ are therefore continually calculated and compared with each other. If the difference between $EFF\_IGA_{gr\_N}$ and $EFF\_IGA\_MIN_{gr\_N}$ is less than a threshold value, this shows that a valve lift switchover is not possible without a sudden change in torque. A valve lift switchover at this point is therefore expediently omitted. Another option would be to switch over a smaller number of cylinders to the higher valve lift instead of half the cylinders. For example, in an internal combustion engine with six cylinders, it is possible to switch over only two instead of three cylinders, with the necessary ignition angle adjustment being reduced accordingly.

A criterion for the option of a valve lift switchover at neutral torque from high cam lift to low cam lift can be determined as follows. The following equation applies for the limit of a valve lift switchover process at neutral torque:

$$NR\_ZYL*TQI_{gr\_N}*EFF\_IGA\_MIN_{gr\_N} = NR\_ZYL/2*(TQI_{k1\_N}*EFF\_IGA_{k1\_N} + TQI_{gr\_N}*EFF\_IGA\_MIN_{gr\_N}) \quad (3)$$

The left-hand side represents the torque of all cylinders before the switchover process, assuming that the ignition angle has been returned to the minimum ignition angle (and the throttle valve 10 has been adjusted in the open direction to increase pressure in the intake tract). The right-hand side of the equation (3) represents the sum of the torques, which has to be delivered by the cylinders with low cam lift and the cylinders with high cam lift after the switchover process, in order to avoid a sudden change in torque.

Equation (3) gives the following for efficiency $EFF\_IGA_{k1\_N}$:

$$EFF\_IGA_{k1\_N} = (2*TQI_{gr\_N}*EFF\_IGA\_MIN_{gr\_N} - TQI_{gr\_N}*EFF\_IGA\_MIN_{gr\_N})/TQI_{k1\_N} \quad (4)$$

Efficiency $EFF\_IGA_{k1\_N}$ is the efficiency at which the cylinders with low cam lift would have to operate after the valve lift switchover in order to keep the torque at a constant level.

If efficiency $EFF\_IGA_{k1\_N}$ is higher than efficiency $EFF\_IGA\_BAS_{k1\_N}$, a sudden negative change in torque is created. Efficiency $EFF\_IGA_{k1\_N}$ and efficiency $EFF\_IGA\_BAS_{k1\_N}$ are therefore continually calculated and compared with each other, to produce a criterion for the option of valve lift switchover at neutral torque. If the difference between $EFF\_IGA\_BAS_{k1\_N}$ and $EFF\_IGA_{k1\_N}$ is less than a threshold value, there is either no valve lift switchover or a valve lift adjustment takes place for a reduced number of cylinders, in order to avoid a sudden change in torque.

The method described above thus provides a reliable criterion for deciding whether a valve lift switchover is permissible from a low to high cam lift as well as from a high to low cam lift.

Figure 2:
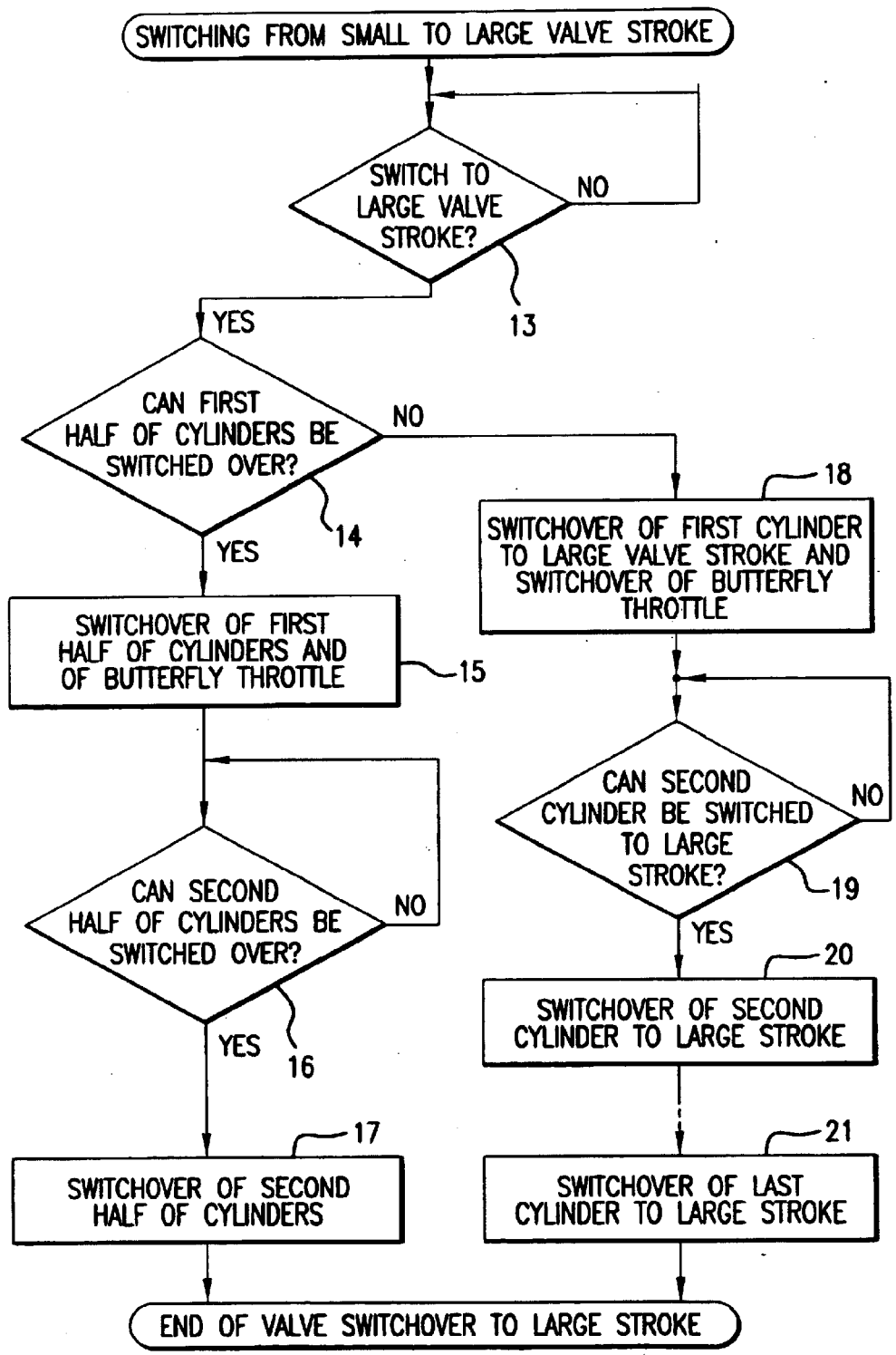
FIG. 2 shows a flow diagram illustrating an example of a method according to the invention to control the valve lift of inlet valves.

Referring to the flow diagram in FIG. 2, an example is described for the method according to the invention for controlling the valve lift of discretely adjustable inlet valves. It is assumed that the internal combustion engine is running with the inlet valves having low valve lift. Whether a switchover is to be made to high valve lift is therefore continually queried (stage 13).

If the answer to this query is yes, a check is made to see whether the first half of the cylinders is to be switched over, without creating a sudden change in torque (stage 14). In more detailed terms, a check is made as described above, to see whether the difference between $EFF\_IGA_{k1\_N}$ and $EFF\_IGA\_MIN_{gr\_N}$ is less than a threshold value. If so, the valve lift for the first half of the cylinders 2 is adjusted as well as the throttle valve 10 as described above (stage 15).

A check is made at this point to see whether the second half of the cylinders can be switched over (stage 16). For example, as described above, a check is made to see whether the ignition angles for the first half of the cylinders have returned to the base ignition angle. If so, the valve lift for the second half of the cylinders is switched over as described above (stage 17). The valve lift for all cylinders is therefore switched over to high lift.

If the answer to the query at stage 14 is that it is not possible to switch over the first half of the cylinders at neutral torque, it is then usually possible to switch a smaller number of cylinders over to the higher valve lift at neutral torque. In the example shown in FIG. 2, only one cylinder is initially switched over to the high valve lift in this case (stage 18). A check is made at this point using the criterion referred to above, to determine whether the next cylinder can be switched over to high valve lift (stage 19). If so, the second cylinder is switched over to high valve lift (stage 20). This method is continued accordingly, until the last cylinder has been switched over to high valve lift (stage 21).

It is understood that, depending on the number of cylinders in the internal combustion engine, switching over the cylinders in pairs and/or groups can be considered, if it is not possible to switch over half the cylinders at neutral torque. Any corresponding adaptation and/or change to the flow diagram shown in FIG. 2 is therefore evident to the person skilled in the art.

What is claimed is:

1. A method for controlling a valve lift of discretely adjustable inlet valves in a multi-cylinder internal combustion engine, the operation of which is regulated by an electronic operation control unit, comprising adjusting the valve lift for a first section of cylinders and, after a delay, for a second section of cylinders, to ensure a valve lift switchover of inlet valves.

2. The method according to claim 1, wherein the valve lift is adjusted for the cylinders individually or in groups consecutively.

3. The method according to claim 2, wherein the valve lift is first adjusted for a first half of the cylinders and then for a second half of the cylinders.

4. The method according to claim 3, wherein the adjustment of the valve lift for the first section of cylinders is performed such that combustion in each cylinder in the first section of cylinders takes place alternately with combustion in a cylinder in the second section of cylinders.

5. The method according to claim 1, wherein during adjusting the valve lift for the first and second section of cylinders, the torque of the internal combustion engine is regulated such that it stays at a value corresponding to a specified torque.

6. The method according to claim 5, wherein a change in torque produced by adjusting the valve lift is compensated by reducing an efficiency of at least some of the cylinders.

7. The method according to claim 6, wherein a change in the efficiency is achieved at least partially by a change in an ignition angle.

8. The method according to claim 6, wherein the change in efficiency is achieved at least partially by a change in an air/fuel ratio.

9. The method according to claim 6, wherein during the valve lift adjustment for the first section of cylinders, a throttle valve mounted in an intake tract of the internal combustion engine is adjusted such that the pressure in the intake tract changes toward a target value, at which all cylinders operate at optimum efficiency after the valve lift adjustment.

10. The method according to claim 9, wherein the valve lift for the second section of cylinders is adjusted at the latest once the cylinders have regained their optimum efficiency after the first valve lift adjustment.

11. The method according to claim 6, wherein the valve lift of the inlet valves is switched over from a low to high value, and during the valve lift adjustment for the first section of cylinders, a throttle valve mounted in an intake tract of the internal combustion engine is adjusted in a close direction and at a same time at least the first section of cylinders is operated at reduced efficiency.

12. The method according to claim 6, wherein the valve lift of the inlet valves is switched over from a high to low value, and before the valve lift adjustment for the first section of cylinders, a throttle valve mounted in an intake tract is adjusted in an open direction and all cylinders a re operated at reduced efficiency, and the valve lift adjustment for the first section of cylinders is effected, once the pressure in the intake tract has reached a value at which an efficiency close to optimum efficiency for all cylinders is achieved by the valve lift adjustment.

13. The method according to claim 7, wherein the efficiency $EFF\_IGA_{gr\_N}$ of the cylinders with high valve lift dependent on the ignition angle, which is necessary for a valve lift adjustment of the first section of cylinders at neutral torque, is constantly calculated and compared with efficiency $EFF\_IGA\_MIN_{gr\_N}$ with a minimum ignition angle, the comparison producing a criterion for an option of valve lift adjustment at neutral torque.

14. The method according to claim 13, wherein if the difference between efficiency $EFF\_IGA_{gr\_N}$ and efficiency $EFF\_IGA\_MIN_{gr\_N}$ is less than a threshold value during a required valve lift switchover, there is either no valve lift adjustment at this point or a valve lift adjustment takes place for a reduced number of cylinders.

15. The method according to claim 7, wherein the efficiency $EFF\_IGA_{k1\_N}$ of the cylinders with low valve lift dependent on the ignition value, which is necessary for the valve lift adjustment of the first section of cylinders at neutral torque, is constantly calculated and compared with efficiency $EFF\_IGA\_BAS_{k1\_N}$ having a base ignition angle, the comparison producing a criterion for the option of valve lift switchover at neutral torque.

16. The method according to claim 15, wherein if the difference between efficiency $EFF\_IGA\_BAS_{k1\_N}$ and efficiency $EFF\_IGA_{k1\_N}$ is less than a threshold value during a required valve lift switchover, there is either no valve lift switchover at this point or a valve lift adjustment takes place for a reduced number of cylinders.

* * * * *